(12) United States Patent
Arriaga et al.

(10) Patent No.: US 11,745,420 B1
(45) Date of Patent: Sep. 5, 2023

(54) STEREOLITHOGRAPHY ADDITIVE MANUFACTURING OF MAGNETICALLY ALIGNED LIQUID CRYSTAL ELASTOMERS

(71) Applicants: Lawrence Livermore National Security, LLC, Livermore, CA (US); President and Fellows of Harvard College, Cambridge, MA (US)

(72) Inventors: Rodrigo Telles Arriaga, San Francisco, CA (US); Caitlyn Christian Krikorian, Livermore, CA (US); Elaine Lee, Moraga, CA (US); Jennifer Lewis, Boston, MA (US)

(73) Assignees: Lawrence Livermore National Security, LLC, Livermore, CA (US); President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 17/848,237

(22) Filed: Jun. 23, 2022

(51) Int. Cl.
| | |
|---|---|
| *B29C 64/194* | (2017.01) |
| *B29C 64/188* | (2017.01) |
| *B33Y 10/00* | (2015.01) |
| *B29C 64/124* | (2017.01) |
| *B33Y 80/00* | (2015.01) |

(Continued)

(52) U.S. Cl.
CPC .......... *B29C 64/188* (2017.08); *B29C 64/124* (2017.08); *B33Y 10/00* (2014.12); *B33Y 80/00* (2014.12); *B29K 2021/00* (2013.01); *B29K 2105/0079* (2013.01)

(58) Field of Classification Search
CPC .............................................. B29K 2105/0079
See application file for complete search history.

(56) References Cited

U.S. PATENT DOCUMENTS

| | | | |
|---|---|---|---|
| 8,748,068 B2* | 6/2014 | Kaneiwa | G02B 5/3016 |
| | | | 430/321 |
| 10,703,052 B2 | 7/2020 | Erb et al. | |

(Continued)

FOREIGN PATENT DOCUMENTS

WO  2015188175 A1  12/2015

OTHER PUBLICATIONS

Moran et al., U.S. Appl. No. 17/848,309, filed Jun. 23, 2022.
(Continued)

*Primary Examiner* — Atul P. Khare
(74) *Attorney, Agent, or Firm* — Zilka-Kotab, P.C.

(57) ABSTRACT

A method of forming a three-dimensional structure includes forming a layer of resin comprising liquid crystal oligomers and a photoinitiator, applying a magnetic field to the formed layer in a predefined alignment direction for substantially aligning the liquid crystal oligomers in a first orientation; and exposing the formed layer to radiation for curing a first portion of the layer during application of the magnetic field thereby resulting in the first portion having liquid crystal elastomers substantially aligned in the first orientation. The method includes applying a second magnetic field to the formed layer in a predefined second alignment direction for substantially aligning uncured liquid crystal oligomers in a second orientation, and exposing the layer to radiation for curing a second portion of the layer during application of the second magnetic field thereby resulting in the second portion having liquid crystal elastomers substantially aligned in the second orientation.

14 Claims, 8 Drawing Sheets

(51) Int. Cl.
*B29K 105/00* (2006.01)
*B29K 21/00* (2006.01)

(56) References Cited

U.S. PATENT DOCUMENTS

| | | | |
|---|---|---|---|
| 10,987,941 B2* | 4/2021 | Goodrich | B29C 67/00 |
| 11,130,288 B2 | 9/2021 | Moran | |
| 2002/0180916 A1 | 12/2002 | Schadt et al. | |
| 2019/0077071 A1 | 3/2019 | Ware et al. | |
| 2020/0230881 A1* | 7/2020 | Suwa | B33Y 80/00 |
| 2020/0298493 A1* | 9/2020 | Wilds | B33Y 30/00 |
| 2022/0097294 A1* | 3/2022 | Suwa | B22F 10/30 |
| 2022/0355540 A1* | 11/2022 | Meenakshisundaram | B29C 64/129 |

OTHER PUBLICATIONS

Restriction Requirement from U.S. Appl. No. 17/848,309, dated Oct. 24, 2022.
Lall et al., "In situ, spatially variable photoalignment of liquid crystals inside a glass cell using Brilliant Yellow," Proceedings of SPIE Photosensitive Materials and their Applications II, vol. 12151, May 24, 2022, 8 pages.
Traugutt et al., "Liquid-Crystal-Elastomer-Based Dissipative Structures by Digital Light Processing 3D Printing," Advanced Materials, 2020, pp. 1-7.
Yao et al., "Multiresponsive polymeric microstructures with encoded predetermined and self-regulated deformability," PNAS, vol. 115, No. 51, Dec. 18, 2018, pp. 12950-12955.
Li et al., "Liquid-induced topological transformations of cellular microstructures," Nature, vol. 592, Apr. 15, 2021, pp. 386-391.
Anwer et al., "Orientation kinetics of thermotropic main-chain liquid-crystalline polymers in a magnetic field," Polymer, vol. 32, 1991, pp. 103-108.
Tabrizi et al., "Voxelated Molecular Patterning in Three-Dimensional Freeforms," Applied Materials & Interfaces, vol. 11, 2019, pp. 28236-28245.
Li et al., "Remotely Controlled, Reversible, on-Demand Assembly and Reconfiguration of 3D Mesostructures via Liquid Crystal Elastomer Platforms," Applied Materials & Interfaces, vol. 13, 2021, pp. 8929-8939.
Ware et al., "Voxelated liquid crystal elastomers," Science, Feb. 27, 2015, vol. 347, No. 6225, pp. 982-984.
Martin et al., "Designing bioinspired composite reinforcement architectures via 3D magnetic printing," Nature Communication, Oct. 2015, pp. 1-7.
Herbert et al., "Synthesis and alignment of liquid crystalline elastomers," Nature Reviews, Materials, vol. 7, Jan. 2022, pp. 23-38.
Jackson et al., "Field responsive mechanical metamaterials," Science Advances, vol. 4, Dec. 7, 2018, pp. 1-9.
Davidson et al., "3D Printable and Reconfigurable Liquid Crystal Elastomers with Light-Induced Shape Memory via Dynamic Bond Exchange," Advanced Materials, vol. 32, 2020, pp. 1-6.
Kotikian et al., "3D Printing of Liquid Crystal Elastomeric Actuators with Spatially Programed Nematic Order," Advanced Materials, vol. 30, 2018, pp. 1-6.
Kim et al., "Printing ferromagnetic domains for untethered fast-transforming soft materials," Nature Letter, vol. 558, Jun. 14, 2018, 18 pages.
Ambulo et al., "4D-Printable Liquid Metal?Liquid Crystal Elastomer Composites," Applied Materials and Interfaces, vol. 13, 2021, pp. 12805-12813.
Xie et al., "Liquid crystal elastomers, networks and gels: advanced smart materials," Journal of Materials Chemistry, vol. 15, 2005, pp. 2529-2550.
Ohm et al., "Liquid Crystalline Elastomers as Actuators and Sensors," Advanced Materials, vol. 22, 2010, pp. 3366-3387.
Zhang et al., "4D Printing of a Liquid Crystal Elastomer with a Controllable Orientation Gradient," Applied Materials and Interfaces, vol. 11, 2019, pp. 44774-44782.
Saed et al., "Molecularly-Engineered, 4D-Printed Liquid Crystal Elastomer Actuators," Advanced Function Materials, vol. 29, 2019, pp. 1-9.
Skylar-Scott et al., "Voxelated soft matter via multimaterial multinozzle 3D printing," Nature, vol. 575, Nov. 14, 2019, 19 pages.
Zheng et al., "Ultralight, Ultrastiff Mechanical Metamaterials," Science, vol. 344, No. 6190, Jun. 20, 2014, pp. 1373-1377.
Matsumori et al., "Photoalignment of an Azobenzene-Based Chromonic Liquid Crystal Dispersed in Triacetyl Cellulose: Single-Layer Alignment Films with an Exceptionally High Order Parameter," ACS Applied Materials and Interfaces, vol. 7, 2015, pp. 11074-11078.
Lopez-Valdeolivas et al., "4D Printed Actuators with Soft-Robotic Functions," Macromolecular Rapid Communications, vol. 39, 2018, pp. 1-7.
Guo et al., "3D Microstructures of Liquid Crystal Networks with Programmed Voxelated Director Fields," Advanced Materials, vol. 32, 2020, 10 pages.
Non-Final Office Action from U.S. Appl. No. 17/848,309, dated Jan. 6, 2023.
Ex Parte Quayle from U.S. Appl. No. 17/848,309, dated Apr. 28, 2023.

* cited by examiner

STEREOLITHOGRAPHY ADDITIVE MANUFACTURING OF MAGNETICALLY ALIGNED LIQUID CRYSTAL ELASTOMERS

This invention was made with Government support under Contract No. DE-AC52-07NA27344 awarded by the United States Department of Energy. The Government has certain rights in the invention. This invention was made with government support under 2011754 awarded by National Science Foundation (NSF) and under W911NF-17-1-0351 awarded by U.S. Army Research Office (ARO). The government has certain rights in this invention.

FIELD OF THE INVENTION

The present invention relates to additive manufacturing of liquid crystal elastomers, and more particularly, this invention relates to the magnetic alignment of liquid crystal elastomers to form a three-dimensional structure by stereolithography additive manufacturing techniques.

BACKGROUND

Additive manufacturing (AM) of liquid crystal elastomers (LCEs) is on the rise, as shown by the growing number of studies using direct ink write (DIW) of LCEs to form three-dimensional (3D) structures. However, DIW additive manufacturing techniques cannot achieve higher part resolution, increased part complexity, and 180° liquid crystal (LC) alignment control within local volume elements leading to 3D-to-3D shape change, which would benefit a wider range of application spaces. For example, DIW techniques may not form complex shapes such as octet truss, gyroid, etc. Moreover, DIW techniques have not demonstrated an LCE alignment for shape change in a 3D space distinct from a shape change in a two-dimensional (2D) space. There is a need to extend LCE printing of 3D structures to stereolithography (SLA) vat polymerization. However, recent studies of printing LCEs using lithography techniques do not include alignment of the LC molecules, and thus, without alignment, the resultant parts have limited 3D-to-3D shape change properties. A process to provide layer-by-layer printing with precisely controlled LC alignment throughout a printed 3D part that allows a 3D transition of the part after printing remains elusive.

SUMMARY

According to one embodiment, a method of forming a three-dimensional structure comprising liquid crystal elastomers includes forming a layer of resin comprising liquid crystal oligomers and a photoinitiator. The liquid crystal oligomers comprise at least one mesogen. The method includes applying a first magnetic field to the formed layer of resin in a predefined first alignment direction for substantially aligning the liquid crystal oligomers in a first orientation; exposing the formed layer to radiation for curing a first portion of the layer during application of the first magnetic field thereby resulting in the first portion having liquid crystal elastomers substantially aligned in the first orientation. The method further includes applying a second magnetic field to the formed layer of resin in a predefined second alignment direction for substantially aligning uncured liquid crystal oligomers in a second orientation, and exposing the layer to radiation for curing a second portion of the layer during application of the second magnetic field thereby resulting in the second portion having liquid crystal elastomers substantially aligned in the second orientation.

According to another embodiment, a product includes a three-dimensional structure having a plurality of sequentially-formed layers comprised of liquid crystal elastomers. The liquid crystal elastomers in at least a predefined portion of a first of the layers are substantially aligned in a first orientation, and the liquid crystal elastomers in at least a predefined portion of a second of the layers are substantially aligned in a second orientation. In addition, each of the portions of the three-dimensional structure is characterized as exhibiting a shape change in response to a stimulus, where the shape change is reversible.

Other aspects and advantages of the present invention will become apparent from the following detailed description, which, when taken in conjunction with the drawings, illustrate by way of example the principles of the invention.

Figure 7:
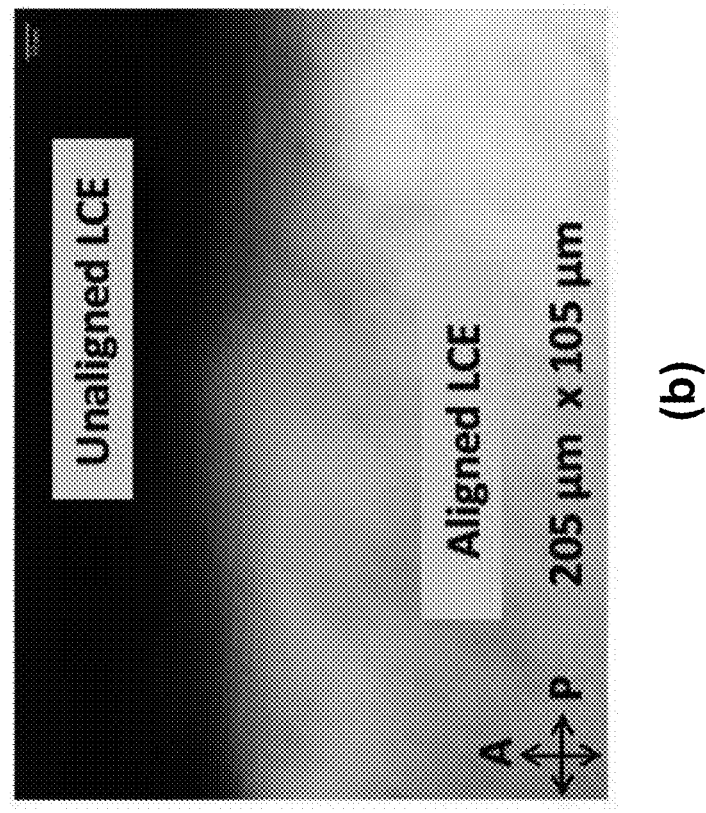
Figure 7:
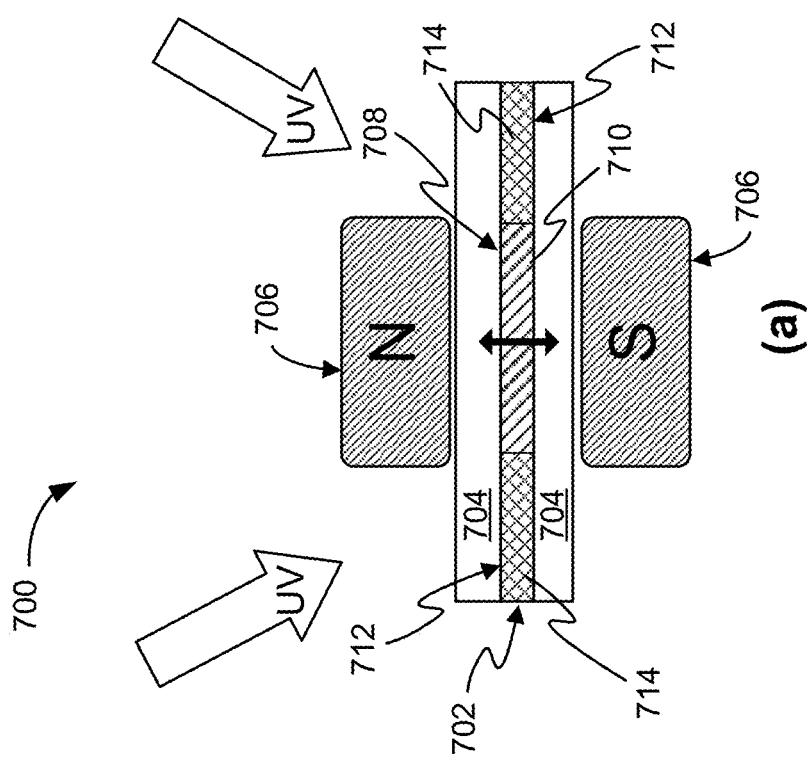

Part (a) of FIG. 7 is a schematic drawing of an apparatus of magnetic alignment of portions of LCEs in a layer, according to one embodiment. Part (b) of FIG. 7 is a polarized optical image of a layer of cured LCEs having a predefined portion that has aligned LCEs in contrast to a portion that has randomly aligned LCEs, according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

For the purposes of this application, room temperature is defined as in a range of about 20° C. to about 25° C.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt. % is defined as the percentage of weight of a particular component relative to the total weight/mass of the mixture. Vol.% is defined as the percentage of volume of a particular compound relative to the total volume of the mixture or compound. Mol.% is defined as the percentage of moles of a particular component relative to the total moles of the mixture or compound. Atomic % (at. %) is defined as a percentage of one type of atom relative to the total number of atoms of a compound.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

In addition, the present disclosure includes several descriptions of a "resin" used in an additive manufacturing process to form the inventive aspects described herein. It should be understood that "resins" (and singular forms thereof) may be used interchangeably and refer to a composition of matter comprising a plurality of oligomers, particles, small molecules, etc. coated with and dispersed throughout a liquid phase. In some inventive approaches, the resin may be optically transparent having a greater than 90% transmittance of light. In some inventive approaches, the resin is light sensitive where exposure to a particular light source changes the physical and/or chemical properties of the resin.

The following description discloses several preferred structures formed via photo polymerization processes, e.g., projection microstereolithography, photolithography, two photon polymerization, etc., or other equivalent techniques and therefore exhibit unique structural and compositional characteristics conveyed via the precise control allowed by such techniques. The physical characteristics of a structure formed by photo polymerization processes may include fabrication of a solid micro-structure having complex geometric arrangement of ligaments, filaments, etc. The formation of a three-dimensional structure includes exposing a resin to light, where a pattern in the photoresist is created by the exposing light.

The following description discloses several preferred embodiments of ink formulations for forming a three-dimensional (3D) structure of liquid crystal elastomers (LCEs) having aligned liquid crystals in a predefined direction, the 3D structure being capable of a shape change, and/or related systems and methods.

In one general embodiment, a method of forming a three-dimensional structure comprising liquid crystal elastomers includes forming a layer of resin comprising liquid crystal oligomers and a photoinitiator. The liquid crystal oligomers comprise at least one mesogen. The method includes applying a first magnetic field to the formed layer of resin in a predefined first alignment direction for substantially aligning the liquid crystal oligomers in a first orientation; exposing the formed layer to radiation for curing a first portion of the layer during application of the first magnetic field thereby resulting in the first portion having liquid crystal elastomers substantially aligned in the first orientation. The method further includes applying a second magnetic field to the formed layer of resin in a predefined second alignment direction for substantially aligning uncured liquid crystal oligomers in a second orientation, and exposing the layer to radiation for curing a second portion of the layer during application of the second magnetic field thereby resulting in the second portion having liquid crystal elastomers substantially aligned in the second orientation.

In another general embodiment, a product includes a three-dimensional structure having a plurality of sequentially-formed layers comprised of liquid crystal elastomers. The liquid crystal elastomers in at least a predefined portion of a first of the layers are substantially aligned in a first orientation, and the liquid crystal elastomers in at least a predefined portion of a second of the layers are substantially aligned in a second orientation. In addition, each of the portions of the three-dimensional structure is characterized as exhibiting a shape change in response to a stimulus, where the shape change is reversible.

A list of acronyms used in the description is provided below.

2D two-dimensional
3D three-dimensional
AM Additive manufacturing
DIW direct ink writing
LC Liquid crystal
LCE Liquid crystal elastomer
MS millisecond
nm nanometer
PµSL projection micro stereolithography
SLA stereolithography
T tesla
$T_{NI}$ Nematic-to-isotropic transition temperature
µm micron
UV ultraviolet
wt. % weight percent Liquid crystal elastomers (LCEs) combine the properties of liquid crystals (orientational order and mobility) and polymer networks (rubbery elasticity). Due to the coupling of the anisotropic liquid crystal (LC) molecules to elastomer networks, LCEs exhibit a reversible shape memory effect upon an anisotropic-to-isotropic transition, which can be triggered by external stimuli, such as temperature, light, electric field, etc. The resultant shape change may be determined by the alignment direction of the liquid crystals. Current methods are limited to alignment of LC molecules in two-dimensional LCE films that may be induced to shape change into three-dimensional space.

Moreover, current methods for printing LCEs are limited to direct ink write (DIW) additive manufacturing methods. DIW printing of LCEs involves shear and extensional forces during extrusion that unidirectionally align the LC molecules along the printing direction. The alignment of the liquid crystals in the LCE is randomized when heated above their nematic-to-isotropic transition temperature ($T_{NI}$), and then during extrusion, the LC molecules are aligned along the printing direction. As the strand is printed, it cools to room temperature and is cured with UV, thereby fixing the orientation of the LC molecule alignment. When heated, the shape change of the printed strand is limited to contraction along the filament axis and expansion perpendicular to the filament axis.

An additional drawback of DIW AM methods includes a restriction of feature size resolution. The feature size of DIW printed parts are limited by the diameter of the nozzle for extruding the filament. Thus, typical features sizes of DIW printed parts are about 250 microns (µm). There is a need for greater control of LC alignment beyond the as-deposited alignment afforded by DIW printing techniques to enable 3D-to-3D shape change for a wider range of application spaces, and a need for higher part resolution and increased part complexity.

In preferred approaches, as described herein, LCs are aligned in a predefined orientation, different than the orientation of the as-deposited alignment, during the process of printing and curing in order to set the LC molecules in an elastic network. In so doing, the LCEs respond to environmental stimuli and induce a shape change of the printed structure to an extent determined by a predefined orientation of the LC molecules in the LCE matrix. In one embodiment, a method using a stereolithography (SLA) additive manufacturing technique is capable of forming a 3D printed part having LC molecules substantially aligned according to a predefined orientation in the LCE matrix such that the LCE is capable of inducing a shape change with a higher actuation of strain % (e.g., up to about 50% strain) in response to environmental stimuli. Shape change may be measured as strain in multiple directions. For example, in an extruded filament, when heated, the filament may contract along its axis and expand perpendicular to its axis. However, as described in various embodiment herein, shape change in a 3D structure may occur in many directions according to a complex alignment map.

According to one embodiment, the inherent dipole moment of LC molecules allows the LC molecules to substantially align in an orientation determined by an alignment direction of an applied magnetic field. However, some recent studies that attempted to align LCEs by applying a magnetic field during formation of the LCE material were unable to demonstrate that the formed material has the physical characteristic of shape change in response to a stimuli. In particular, an alignment of main chain LCEs using conventional processes have failed to exhibit shape change above a 2% change in at least one dimension of the formed material. Specifically, SLA printing LCEs without aligning LCs during printing will likely result in a 3D structure that cannot undergo shape change.

In one embodiment, a method combines forming a 3D structure layer-by-layer with predefined 360° magnetic alignment in an x-y plane control of LCs and having a predefined pattern of voxels, where each voxel is comprised of LC molecules substantially aligned in a predefined orientation. A voxel is a local volume element that adds a third dimension (z-dimension) to a two-dimensional (2D) pixel (x-y dimensions). Following alignment, each layer is cured using a voxel-by-voxel polarized light for curing the LCE to set the predefined alignment of the LCs into place. In one approach, a method is disclosed for magnetic alignment of LCE resin within SLA vat polymerization.

Figure 1:
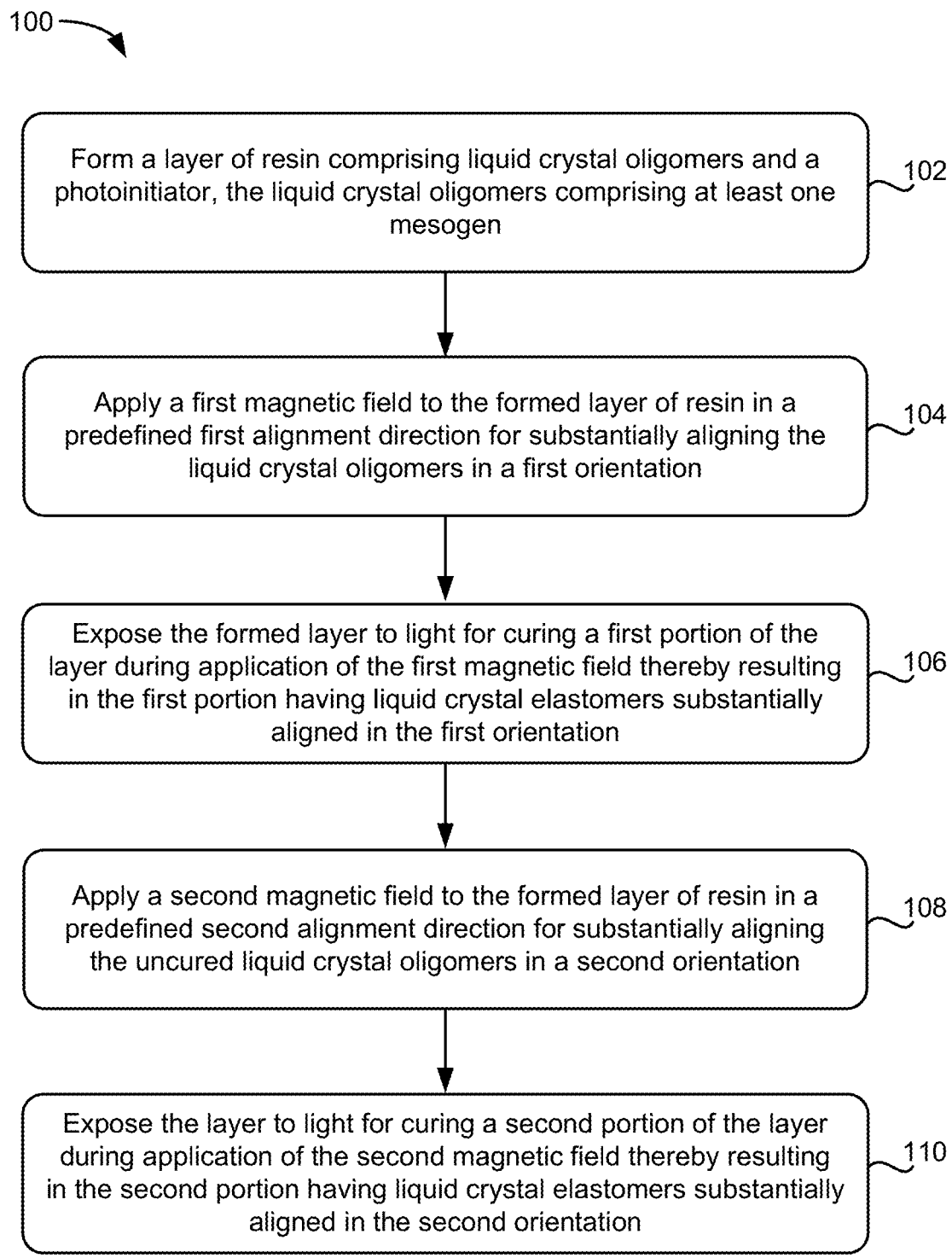
FIG. 1 is a flow chart of a method, according to one embodiment.

FIG. 1 shows a method 100 for forming a 3D structure having LCEs with selective 360° alignment control in the theta θ direction within the x-y plane, in accordance with one embodiment. The printer apparatus may include a rotating magnetic field that may induce an azimuthal alignment angle in the z-direction. As an option, the present method 100 may be implemented to construct structures such as those shown in the other FIGS. described herein. Of course, however, this method 100 and others presented herein may be used to form structures for a wide variety of devices and/or purposes which may or may not be related to the illustrative embodiments listed herein. Further, the methods presented herein may be carried out in any desired environment. Moreover, more, or less operations than those shown in FIG. 1 may be included in method 100, according to various embodiments. It should also be noted that any of the aforementioned features may be used in any of the embodiments described in accordance with the various methods.

The method 100 may begin with operation 102 of forming a layer of resin where the resin includes liquid crystal (LC) oligomers and a photoinitiator. The LC oligomers may include at least one mesogen. In other approaches, the LC oligomers may include mesogens, chain extenders, and reactive end groups. In some approaches, broadly reactive LC mesogens may include both monomer form and oligomer form. In some approaches, the resin may include a photoinhibitor and/or a photoabsorber. The synthesis of an LC oligomer may include at least one mesogen having reactive end groups that combine with chain extender molecules to form a LC oligomer, e.g., a main chain liquid crystal oligomer, LC polymer, etc.

Figure 2A:
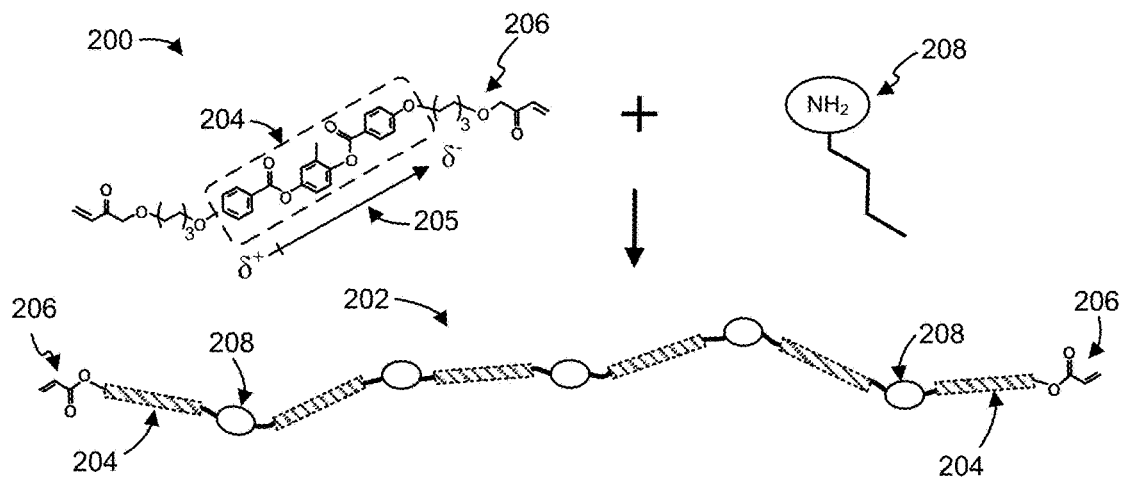
FIG. 2A is a schematic drawing of one example of liquid crystal oligomer synthesis prior to magnetic alignment and UV crosslinking, according to one embodiment.

As illustrated in FIG. 2A, part (a), one example of the synthesis 200 of an LC oligomer 202 includes at least one mesogen 204 having reactive end groups 206 on each end of the mesogen reacted with amine chain extender molecules 208 to form an LC oligomer 202 having at least one amine chain extender molecule 208 positioned between each mesogen 204 of the main chain with reactive end groups 206 on each end of the LC oligomer (e.g., main chain liquid crystal oligomer, LC polymer, etc.). The mesogen 204 molecule has a lateral dipole moment 205. The rod-like molecule of the mesogen 204 positioned between end groups 206 with some degree of polarity that creates a dipole moment 205 that may be oriented substantially parallel along the alignment direction of an adjacent magnetic field.

In various approaches, the resin includes LC oligomers that may be cured as liquid crystal elastomers. In some approaches, the LC oligomers may include main chain LC oligomers, side chain LC oligomers, or a combination of main chain and side chain LC oligomers. In one approach, the resin includes LC oligomers formed with mesogens and chain extender molecules, where the mesogens have reactive end groups. In one approach of the formulation of a resin, an LC oligomer may include one repeat unit of the mesogen molecule. In other approaches of the formulation of the resin, the LC oligomer may include greater than one repeat unit of the mesogen molecule. Mesogens may be obtained commercially.

Theoretically, a maximum shape change of the formed 3D structure may be determined from the aspect ratio of the mesogen molecules of the LC oligomers. The structure of the mesogens may determine the aspect ratio and stiffness of the mesogen molecules. For example, a mesogen having 4 benzene rings is a stiffer molecule than a mesogen with 1 or 2 benzene rings. Upon stimulation, a mesogen molecule may reorient 90° upwards, and thus, a bigger aspect ratio of the mesogen molecule results in a greater degree of shape change. However, a higher aspect ratio of the mesogen molecules may result in a higher viscosity of the resin, and thus, a more rigid resin may inhibit printing efficiency. In a preferred approach, an aspect ratio (i.e., height to width) of the mesogens is about 3:1 to about 5:1. In some approaches, main chain LC oligomers include rigid LC mesogens with a reactive end group on each end for curing (e.g., crosslinking) the LC oligomers into LCEs. In some approaches, each LC oligomer of the resin may include about 3 to 15 mesogen molecules along the backbone of the LC oligomer.

Different mesogens may have different nematic-to-isotropic transition temperatures. For example, mesogens having a higher molecular weight, e.g., higher than a small molecule (i.e., a small molecule being <900 daltons), may result in a higher nematic-to-isotropic transition temperature. For mesogens having a nematic-to-isotropic transition temperature of 100° C., the ratio of different mesogens may be used to lower the nematic-to-isotropic transition temperature below 100° C. Alternatively, the nematic-to-isotropic transition temperature of an LC oligomer may be raised by incorporating more rigid mesogen molecules as a part of the oligomer.

In some approaches, the ratio of mesogens to chain extender molecules in the LC oligomer (e.g., LC polymer) that comprise the resin may characterize mechanical properties of the 3D structure formed using the resin. For example, the ratio of mesogens to chain extenders may determine the extent, type, etc. of shape change of the formed 3D structure. In various approaches, the chain extender molecules between the mesogens may include amines, thiols, etc. In one approach, a ratio of mesogen to the chain extender may be about 1:1. In some approaches, a higher ratio is preferred, for example around 1.4:1 up to 2:1 mesogen to chain extender. An LC oligomer having a higher ratio of mesogens to chain extender results in shorter polymer chains, whereas an LC oligomer having a lower ratio of mesogens to chain extenders results in longer polymer chains. An aligned and cured LCE from longer LC oligomer chains may result in a 3D structure having a capability of a larger shape change in response to external stimuli.

The LC oligomers, LC polymers, etc. are formed by a chain extension process including the mesogens and chain extenders with reactive end groups on each end of the formed LC oligomers. The LC oligomers are preferably formed before being added to the printing process as a resin. In some approaches, a resin may include a mixture of mesogens having reactive end groups but without a chain extender, however, the resin may be highly viscous, rigid, etc.

In one approach, the resin may include an effective amount of an additive for assisting the alignment of the LC oligomers during application of a magnetic field. In various approaches, the additive may include cellulose nanocrystals, carbon nanotubes, magnetically addressable platelet solid filler particles, etc. In some approaches, the additive may be included for assisting in resultant actuation strain, shape change, etc. with the magnetic field.

In some approaches, the resin may include a photoinhibitor. In one approach, a photoinhibitor may extend the pot life of the resin to about 24 hours or greater. In some approaches, a photoinhibitor may be included for controlling the print resolution in the x and/or y direction. In one approach, a photoabsorber may be included for controlling the print resolution in the z-direction. Without wishing to be bound by any theory, it is believed that the inherent dipole moment of some photoabsorbers (e.g., Sudan I) may cause these photoabsorbers to be susceptible to orientation according to an alignment direction of the applied magnetic field.

In one approach, the method 100 may include heating the resin to a temperature below the nematic-to-isotropic transition temperature of the mesogen for forming the layer of resin. In preferred approaches, the resin is heated to reduce the viscosity of the resin and increase the mobility of the LC oligomers. In another approach, the method may include heating the resin to a temperature above the nematic-to-isotropic transition temperature of the mesogen in order to form a portion, voxel, etc. of the layer that may not undergo a shape change in response to a stimulus. The temperature may be sufficient to lower the viscosity of the resin without affecting a phase change of the resin (e.g., below the nematic-to-isotropic temperature of the LC oligomers). The temperature may be determined by the specific formulation of the LC resin. In a preferred approach, the printing apparatus includes a chamber for heating the bath, vat, etc. of resin. In some approaches, the resin may be heated to a temperature in a range of greater than 50° C. to less than 100° C. The desired temperature may be determined by the viscosity and nematic-to-isotropic transition temperature of the formulation of the resin.

In some approaches, the layer may be formed according to a predefined pattern of the printing apparatus. For example, the layer may be a 2D slice as determined from a 3D model of the 3D structure to be printed. The layer may be a geometric shape according to the 2D slice of the 3D model. For example, a hollow sphere may be printed by a series of layers where the first layer is a circle, and subsequent layers are rings, and the final layer is a circle. In various approaches, the resolution of the features of each layer may be determined by the lithography additive manufacturing process. For example, the resolution of features of a layer using a Fortify printer may have a pixel pitch of 75 microns (μm).

Figure 2B:
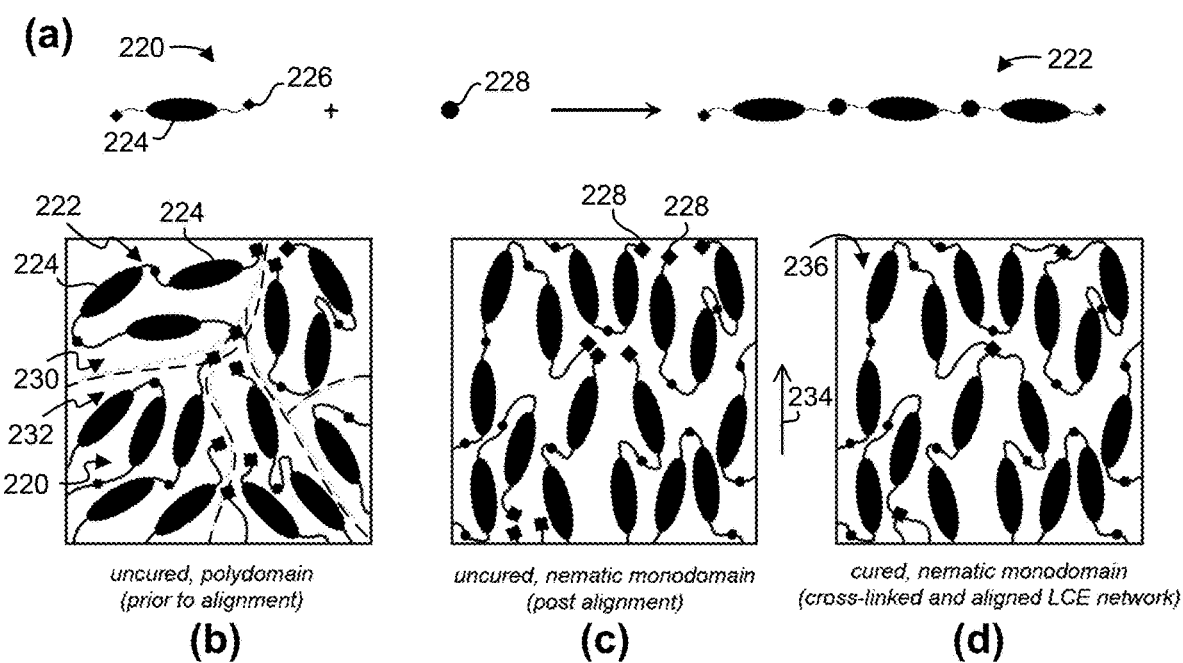
FIG. 2B is a series of schematic drawings of a magnified view of alignment of liquid crystal (LC) molecules, according to various embodiments. Part (a) is a schematic drawing of an LC oligomer, part (b) is a schematic drawing of uncured, polydomain LC oligomers in a resin, part (c) is a schematic drawing of uncured, aligned nematic monodomain LC oligomers in a resin, and part (d) is a schematic drawing of a portion of cured, nematic monodomain LC elastomers (LCEs).

As illustrated in part (a) of FIG. 2B, the synthesis 220 of main chain LC oligomers 222 includes the combination of mesogens 224 having reactive end groups 226 with chain extender molecules 228 to form an LC oligomer 222 having at least one chain extender molecule 228 positioned between the mesogens 224 and a reactive end group 226 positioned at each end of the LC oligomer 222.

Part (b) of FIG. 2B illustrates a portion of a formed layer of LC oligomers 222 prior to alignment. The LC oligomers 222 are present in the layer as a polydomain of uncured oligomers, the polydomain comprising a plurality of domains 230, 232 of LC molecules, (e.g., mesogens 224). For illustrative purposes only, the individual domains 230, 232 are defined by a dashed line between the domains. A domain 230 represents a group of LC molecules substantially aligned in the same orientation. The as-deposited alignment of the resin as a layer may include a plurality of domains 230, 232, having different, randomly aligned LC molecules, and each domain having at least one mesogen 224 aligned along a similar orientation. The polydomain is undefined and formed in the absence of application of a magnetic, electric, electromagnetic, etc. field. A polydomain is the isotropic state where all LCs are randomly aligned, i.e., the alignment is undefined.

In one approach, a stereolithography printing technique allows orientation of liquid crystal molecules layer-by-layer during the printing process by using magnetic alignment during the formation of each layer of LCEs. The inherent dipole moment of liquid crystals, as illustrated in FIG. 2A, may be exploited when a magnetic, electric field, electromagnetic field, etc. is applied. Looking back to FIG. 1, operation 104 of method 100 includes applying a first magnetic field to the formed layer of resin in a first predefined alignment direction for substantially aligning the liquid crystal oligomers in the first orientation. The predefined alignment direction may be selected from one direction of 360° alignment directions. For example, the predefined alignment direction of the magnetic field may be horizontal relative to the build plate (i.e., parallel to the x-y plane of the build plate), vertical relative to the build plate (i.e., perpendicular to the x-y plane of the build plate), at an acute angle relative to the build plate (e.g., slanted), at an obtuse angle relative to the build plate), etc.

Figure 2C:
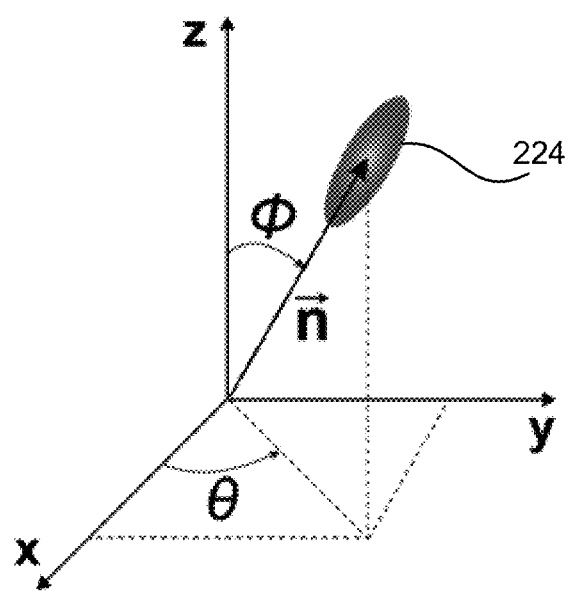
FIG. 2C is a schematic drawing of the range of orientations of liquid crystal molecules, according to one embodiment.

Referring to FIG. 2C, an orientation direction of the liquid crystal molecules, e.g., a mesogen 224 molecule, may be defined by a magnetic director alignment. A dimensionless unit vector, e.g., liquid crystal director ii describes the predominant orientation direction of nearby liquid crystals. A liquid crystal director ii may be decomposed into spherical components as follows:

$$\vec{n} = \begin{cases} n_x = \cos\theta \sin\phi \\ n_y = \sin\theta \sin\phi \\ n_z = \cos\phi \end{cases}$$

where θ varies between 0° and 360°, and φ varies between 0° and 180°. A magnetic field map may be designed to target specific n directions. According to various approaches, a product may be formed voxel-by-voxel where each voxel has LC molecules oriented in unique predefined n direction. The LC molecules may be aligned in the x-y plane in 360° theta (φ) direction. The LC molecules may be aligned in the x-y plane in 360° theta (θ) direction. As illustrated in part (c) of FIG. 2B, for example, application of a magnetic field to the formed layer of resin in a predefined alignment direction substantially aligns the LC molecules into a nematic monodomain of LC molecules in an orientation determined by the magnetic alignment direction 234. The orientations of a majority of, and preferably at least 90% of, the mesogens 224 are substantially aligned (e.g., within 10° of each other, preferably) in a first predefined alignment direction 234 relative to some reference, e.g., the plane of deposition of the layer.

According to some approaches, the orientation of the aligned LCs may be defined as the direction along which the longitudinal axis of the mesogen align. In other words, the orientation of the longitudinal axis of the mesogen molecule is substantially aligned along the alignment direction of the magnetic field. In some approaches, the alignment direction of the magnetic field may be tuned for a specific orientation of the bent core mesogens that are biaxial.

In some approaches, the duration of time for substantially aligning the LC oligomers of the resin in one orientation according to a respective predefined alignment direction of an applied magnetic field may be less than 120 seconds. In other approaches, the duration of time of substantially aligning the LC oligomers may be less than 60 seconds, less than 30 seconds, etc. In an exemplary approach, the duration of time for substantially aligning the LC oligomers during application of a magnetic field may be less than 10 seconds. A surprising and unexpected finding in light of the highly viscous composition of the resin is that orientation of the LC oligomers in the resin according to the alignment direction of the applied magnetic field may occur in the short duration of time of less than 10 seconds. Moreover, in some approaches, a lower intensity of field strength of the applied magnetic field results in alignment of greater than 90% of LC oligomers in less than 10 seconds. For example, in an exemplary approach, a field strength from less than 0.06 tesla (T) to 0.01 T is sufficient to substantially align the LC oligomers according to the alignment direction of the applied magnetic field in less than 10 seconds.

In one approach, the duration of time for substantially aligning the LC oligomers in an orientation determined by the alignment direction of the magnetic field includes the time point of turning on the magnetic field until the time point wherein greater than 90% of the active uncured LC oligomers in the layer are substantially aligned to the respective orientation determined by the alignment direction of the applied magnetic field. In some approaches, the duration of time for substantially aligning the LC oligomers in a predefined portion may include a duration of time measured from a time point of turning on the applied magnetic field until the time point of exposing the predefined portion to radiation, e.g., a light, for curing the aligned LC oligomers. An advantage of the short durations of time, e.g., less than 10 seconds, for greater than 90% of active LC oligomers to be substantially aligned in one orientation includes increased printing efficiency, e.g., faster printing, of each layer of a 3D structure.

Referring back to FIG. 1, operation 106 of method 100 includes exposing the formed layer to radiation for curing a first portion of the layer during application of the first magnetic field thereby resulting in the first portion having liquid crystal elastomers substantially aligned in a first orientation determined by the alignment direction of the first magnetic field. In some approaches, the radiation may preferably be a light, a laser, a beam, etc. The LC oligomer have reactive functional end groups that enable crosslinking during exposure to radiation, e.g., UV light, and incorporate the LC oligomers into a cured liquid crystal elastomer network. In sharp contrast, magnetic alignment of particles that are not functionalized with a crosslinkable ligand, e.g., filler particles, cannot form a crosslinked network, and typically rely on a surrounding crosslinkable material to form a network around the aligned particles to hold the aligned particles in place.

In various approaches, a light for curing the resin may be directed to a portion of the layer having LC oligomers substantially aligned to a first orientation determined by the applied magnetic field. The light may be directed onto the predefined portion by using a projector, masking the layer for exposing the portion to be cured, etc. The wavelength of the light is within a range for causing the end groups of the LC oligomers to crosslink and form a matrix LCE material. The wavelength for curing the aligned LC oligomers may be defined by the photoinitiator included in the resin. In one approach, curing the aligned LC oligomers includes exposing the aligned liquid crystal oligomers to a light at a wavelength in the UV spectrum, e.g., in a range of greater than about 200 nanometers up to about 389 nanometers. In one example, and not meant to be limiting in any way, the formulation of the resin may include a phosphine oxide photoinitiator, such as 2,4,6-trimethylbenzoyldiphenylphosphine oxide, can initiate crosslinking at 405 nm.

As illustrated in part (d) of FIG. 2B, the layer is exposed to a light for curing the resin during application of the magnetic field in a predefined alignment direction. The exposure to the light causes the reactive end groups 226 of the LC oligomer 222 to crosslink and form LC elastomers (LCEs) 236. The LCEs 236 are formed as a cured, nematic monodomain, e.g., a crosslinked and aligned LCE network.

Referring back to FIG. 1, operation 108 of method 100 includes applying a second magnetic field to the formed layer of resin in a predefined second alignment direction for substantially aligning the uncured liquid crystal oligomers to a second orientation. In a preferred approach, the predefined first alignment direction of the first magnetic field is different than the predefined second alignment direction of the second magnetic field.

Operation 110 of method 100 includes exposing the layer to radiation for curing a second portion of the layer during application of the second magnetic field thereby resulting in the second portion having liquid crystal elastomers substantially aligned to the second orientation.

In various approaches, third, fourth, etc. portions, e.g., voxels, of the layer may have the uncured LC oligomers of the third, fourth, etc. portion substantially aligned to an orientation determined by a predefined alignment direction of a different applied magnetic field. Each layer includes a plurality of portions, e.g., voxels, where LC molecules are substantially aligned to a respective orientation of each respective portion. In various approaches, the number of orientations per layer may be limited only by the size of the sample, voxel, portion, etc.

In further approaches, method 100 includes forming a second layer of resin adjacent to the layer of LCEs, where the LCEs has been substantially aligned and cured in operations 104, 106, 108, and 110. A next operation may include applying a third magnetic field to the formed second layer of resin in a third predefined alignment direction for substantially aligning the LC oligomers of the resin to a third orientation. In another approach, the third magnetic field may have the same alignment direction as the first magnetic field, as described for operation 104. In yet another approach, the third magnetic field may have the same alignment direction as the second magnetic field, as described for operation 108.

During the application of the third magnetic field, the formed second layer may be exposed to a radiation for curing a first portion of the second layer thereby resulting in the first portion of the formed second layer having LCEs substantially aligned to the third orientation determined by the alignment direction of the third applied magnetic field. The second layer may comprise a plurality of portions having LCs substantially aligned to a respective orientation of each respective portion. The alignment direction of each applied magnetic field may be determined as a target alignment direction as described in FIG. 2C.

Figure 3:
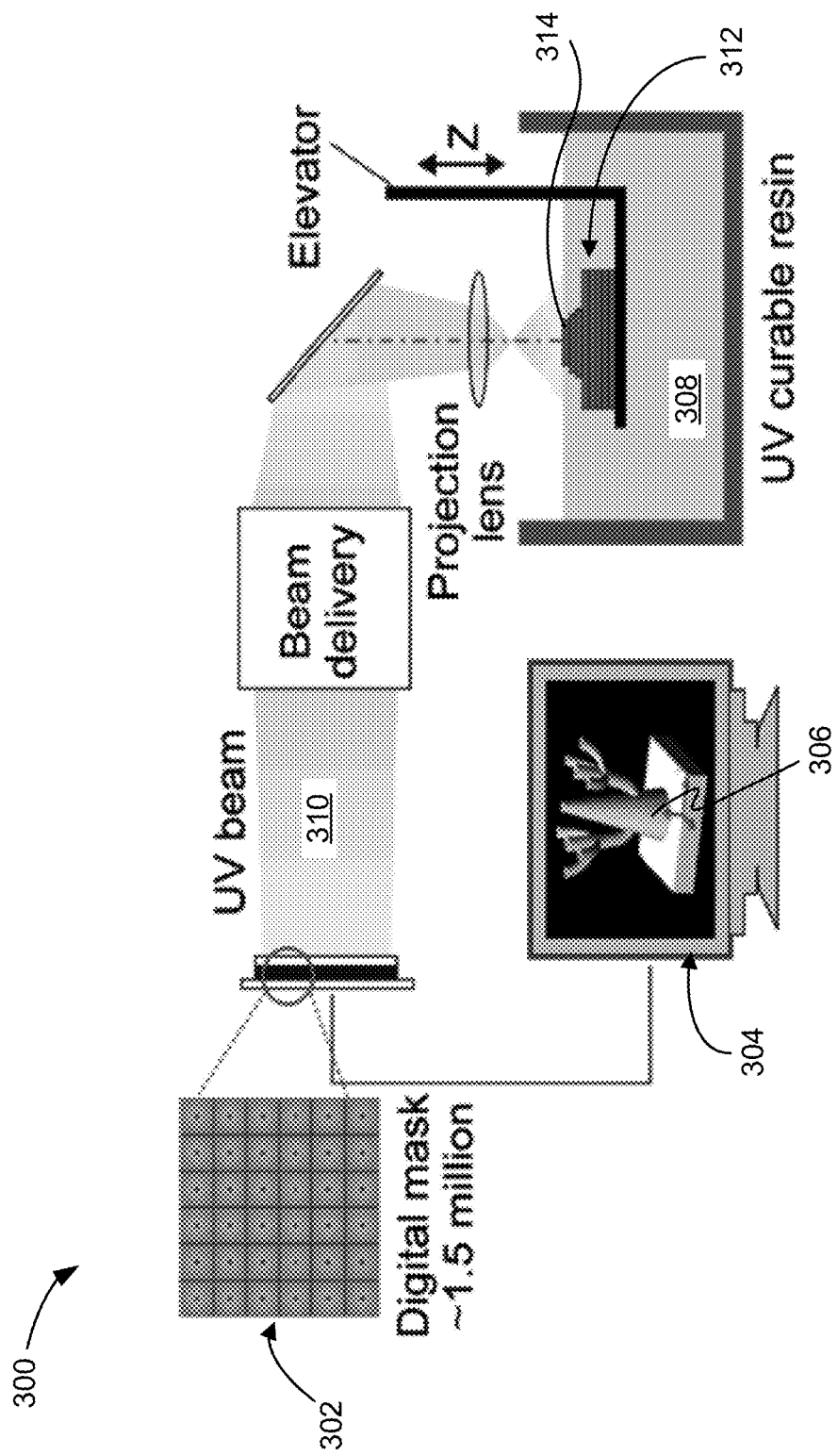
FIG. 3 is a schematic drawing of a standard projection microstereolithography (PµSL) vat polymerization process.

The method of forming a 3D polymer structure is highly scalable and compatible with additive manufacturing (e.g., 3D printing). According to a method described herein, the 3D structure may be formed using a lithography-based additive manufacturing (AM) system. In some approaches, AM techniques such as projection micro-stereolithography (POL) may be employed. A PµSL system 300, as illustrated in FIG. 3, is a lithography-based technique where 2D slices, layers 302 of a 3D model 304 of a 3D object 306 are projected into a vat of photosensitive resin 308 with UV light 310, forming the final 3D structure 312 layer-by-layer. For example, each layer 314 may be formed according to a predefined pattern determined by a layer 302 of a 3D model 304. A 3D model 304 of the structure, object 306, etc. is divided into a plurality of layers 302, each layer 314 formed according to a predefined patterned determined by a layer 302 of the 3D model 304. Printing with PµSL provides advantages of printing increased part complexity and resolution. Moreover, decreasing the strut diameters of a 3D printed structure while maintaining structural integrity will allow for faster actuation times of shape change of the structure.

For forming a 3D structure 312, the orientations of alignment of LCs in each layer 314 of resin 308 may correspond to a predefined pattern of an associated layer 302 of a 3D model 304. In various approaches, the product has physical characteristics of formation by an additive manufacturing technique. In various approaches, physical characteristics may include filaments arranged in a geometric pattern, a patterned outer surface defined by stacking filaments, etc. Thus, using these additive manufacturing techniques allows engineering of parts and production of optimal geometry for shape change, mechanical strength, etc.

In one approach, the lithography technique may be a bottom-up building platform such that the light beam delivery approaches the build plate from the top, e.g., the PµSL system, as illustrated in FIG. 3. In another approach, the lithography technique may be a top-down building platform such that the light beam delivery approaches the build plate from the bottom, e.g., the Fortify printer, as shown illustrated in FIG. 4.

Figure 4:
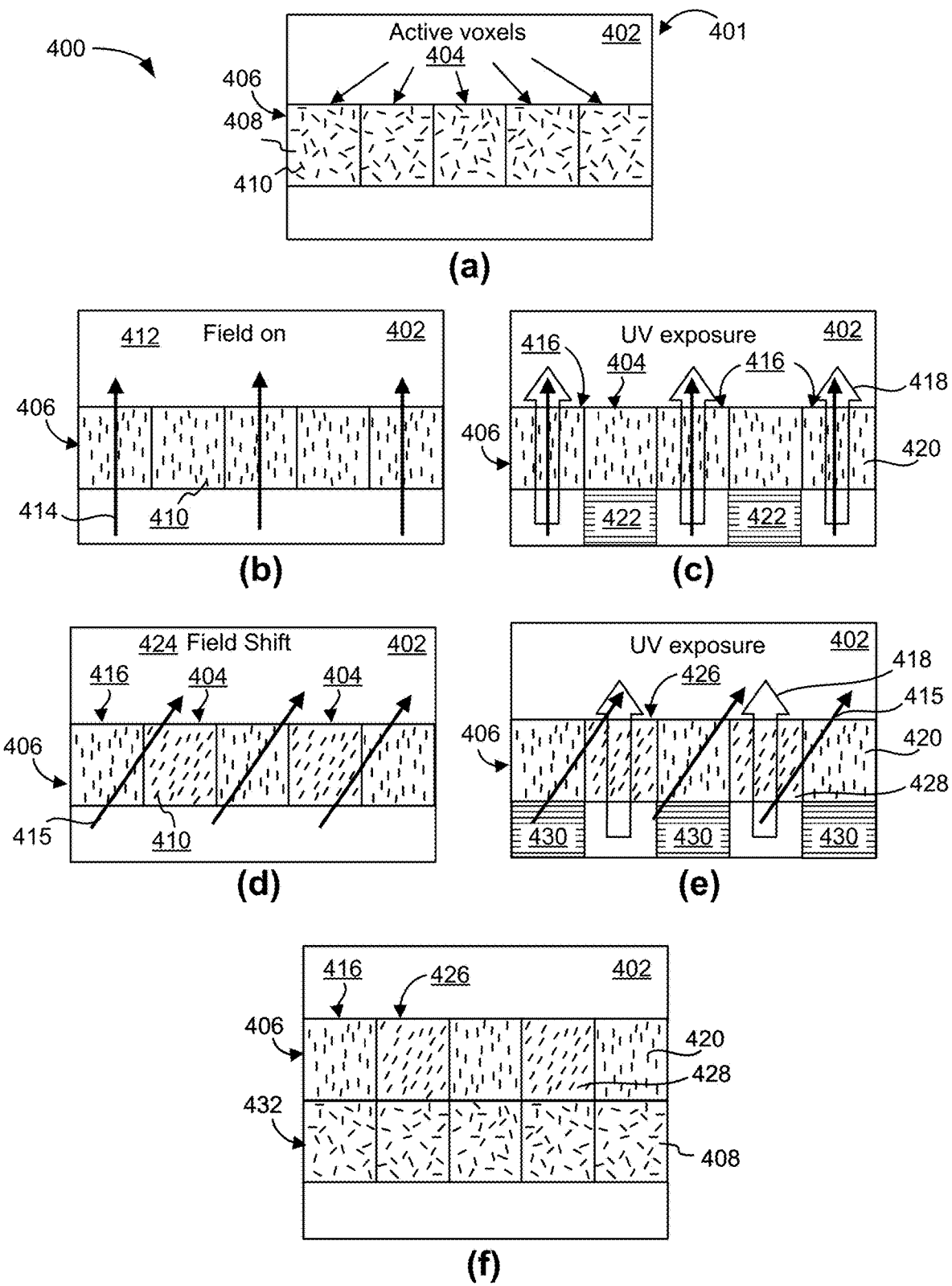
FIG. 4 is a schematic drawing of a magnetic alignment approach for voxel-by-voxel liquid crystal aligned SLA layers, according to one embodiment. Part (a) depicts a layer of resin, part (b) depicts the application of a magnetic field in a predefined alignment direction, part (c) depicts exposure of predefined portions of the layer to a UV light to cure the resin, part (d) depicts the application of a different magnetic field in a different predefined alignment direction, part (e) depicts exposure of predefined portions of the layer to a UV light to cure the resin, and part (f) depicts addition of the next layer of uncured, unaligned resin adjacent to the cured layer.

In one approach, method 100 of FIG. 1 of forming a 3D structure may include layer-by-layer during an SLA printing techniques that results in LCEs substantially aligned to an orientation determined by a predefined alignment direction of an applied magnetic field during the printing process. A 3D structure has a plurality of layers, each layer having a plurality of portions, each portion having LCEs substantially aligned to an orientation determined by a predefined alignment direction of an applied magnetic field. As an example, FIG. 4 illustrates a method 400 of aligning LCEs during an SLA print using magnetic alignment to exploit the inherent dipole moment of LCs and align the LCs along the direction of the applied magnetic field. The magnetic alignment approach of the method 400 as illustrated in FIG. 4 uses a bottom-up lithography-based system while applying a magnetic field via solenoids to align material in each layer followed by subsequent UV exposure to lock the alignment in place. In other approaches, magnetic alignment may be employed with a top down printing approach described in a PµSL system. The following approach describes substantially aligning LC molecules to an orientation determined by a predefined alignment direction of an applied magnetic field. The process of aligning LCs is voxel-by-voxel to allow the resultant printed 3D structure to undergo a high degree of shape change.

As illustrated in part (a), the method 400 begins with forming a layer 406 of resin 408 having LC molecules 410. The alignment of LCs as-deposited have an orientation in nonspecific directions, e.g., the LCs are isotropic. The LCs may group in sub domains such that the layer has a polydomain of LCs. The printing method may form a predefined portions of the layer on a build plate 402 of the printing apparatus 401, where each predefined portion includes at least one voxel 404. The voxels 404 may be described as active voxels having LCs that are not substantially aligned to a single orientation, rather the LCs of the active voxel are unaligned being oriented in multiple non-specific directions.

Part (b) illustrates the application of a first magnetic field 412 in a predefined first alignment direction 414, where the first magnetic field 412 is applied to the layer 406 of resin 408. The first alignment direction 414 of the first magnetic field 412 induces the LCs 410 to substantially align to a first orientation determined by the first alignment direction 414 of the first magnetic field 412. The first alignment direction of the applied magnetic field may be predefined by a 3D model of the desired printed 3D object.

As illustrated in part (c), while the first magnetic field 412 is applied to the layer 406, at least one predefined portion 416 is exposed to a light (418, large arrows) for curing the LC oligomers of the resin 408 to form an LCE 420 matrix having LCs 410 substantially aligned to a first orientation determined by the first alignment direction 414. In some approaches the shape, dimensions, etc. of the portion, voxel, etc. to be cured by light may be determined by a 3D model of the desired printed 3D object. In one approach, the light may be projecting illumination, e.g., UV light, from a digital light projector. The light is projected on the at least one predefined portion of the aligned LC oligomers of the resin. In another approach, the light 418 may be projected on the layer 406 of LC oligomers substantially aligned to an orientation determined by the first alignment direction 414 such that each portion 416 is defined according to a respective mask 422 applied to the formed layer during the respective exposure of the layer 406 to the light 418. The masked portions block the active voxels 404 having uncured resin 408 from curing when the layer 406 is exposed to the light 418. The masks may be removed after curing the predefined portions.

A second magnetic field 424 having a predefined second alignment direction 415 may be applied to the layer 406 of resin 408, as illustrated in part (d) of FIG. 4. As illustrated, the second magnetic field 424 has a field shift in alignment direction from the alignment direction of the first magnetic field 412, where the predefined second alignment direction 415 is different from the predefined first alignment direction 414. The LCs 410 in the uncured portions, voxels 404, etc. become substantially aligned to a second orientation determined by the second alignment direction 415 of the second magnetic field 424. The cured portions 416 having LCEs 420 substantially aligned to a first orientation determined by the first magnetic field 412 are not affected by the application of the second magnetic field 424 and substantially aligned to the first orientation determined by the first alignment direction 414 during application of the second magnetic field 424.

As illustrated in part (e), while the second magnetic field 424 is applied to the layer 406, the predefined portion 426 is exposed to a light (418, large arrows) for curing the LC oligomers of the resin 408 to form an LCE 428 matrix having LCs 410 substantially aligned to a second orientation determined by the second alignment direction 415 of the second magnetic field 424. In one approach, the light may be projecting illumination, e.g., UV light, from a digital light projector. The light is projected on the at least one predefined portion of the aligned LC oligomers of the resin. In another approach, the light 418 may be projected on the layer 406 of aligned LC oligomers such that each portion 426 is defined according to a respective mask 430 applied to the formed layer during the respective exposure of the layer 406 to the light 418. The masks may be removed after curing the predefined portions.

Upon completion of substantially aligning the LCs 410 to respective orientations of each portion and curing the LCE material in portions 416, 426 of the first layer 406, a second layer 432 of resin 408 may be formed adjacent to the first layer 406 on the build plate 402, as illustrated in part (f) of FIG. 4. The first layer 406 includes portions 416, 426 having LCEs 420, 428, respectively, substantially aligned to a respective orientation according to the respective predefined alignment direction of each applied magnetic field.

In one approach, the second layer 432 may include predefined portions similar to the predefined portions of first layer 406. The LC oligomers of the predefined portions are substantially aligned to a respective orientation determined by the respective alignment direction of the applied magnetic field and set by UV exposure as illustrated in parts (b) to (e) of FIG. 4. In another approach, the second layer may include portions as defined by a predefined pattern determined by a 2D slice (e.g., layer) of a 3D model. The method 400 and various approaches are by way of example only and are not meant to be limiting in any way.

Figure 5:
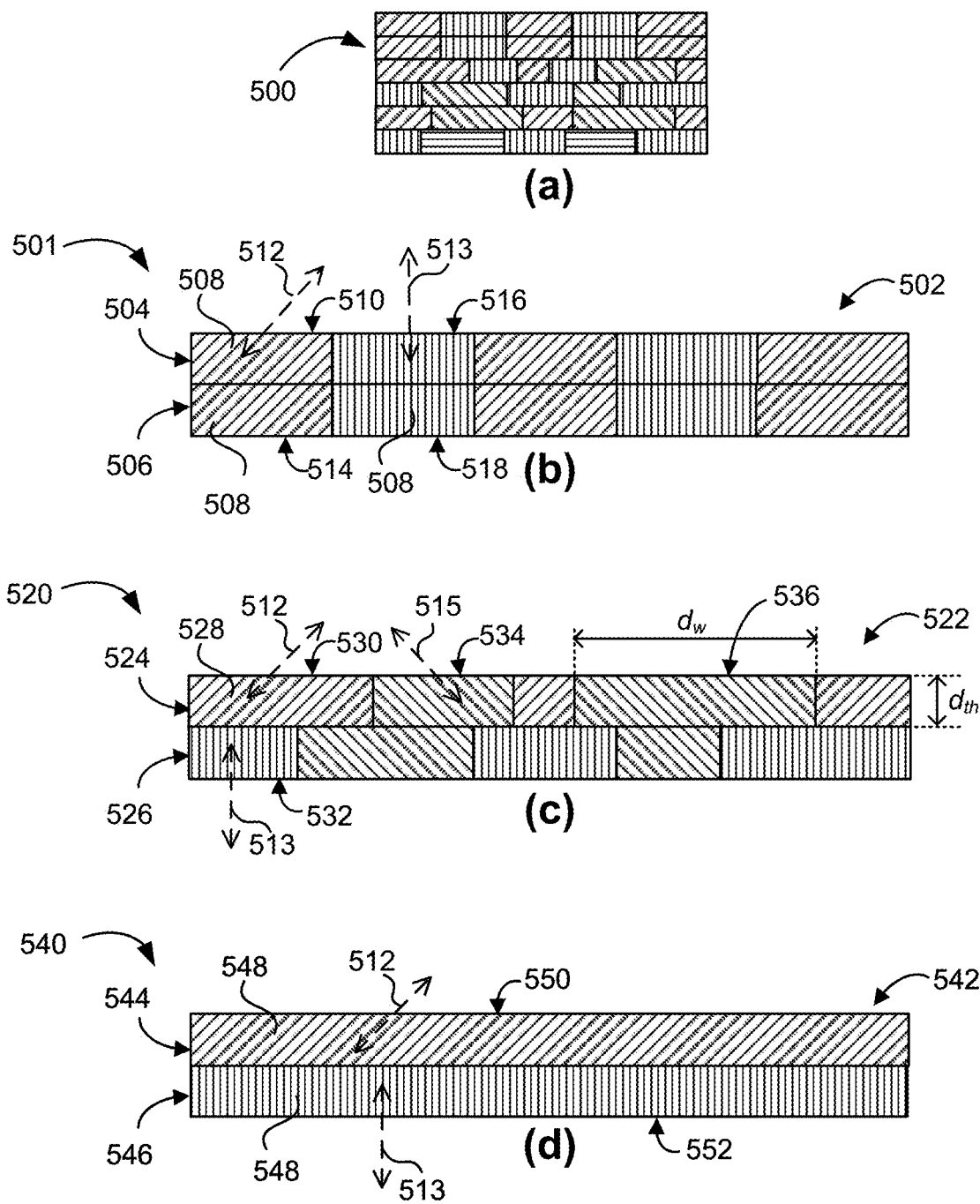
FIG. 5 is a series of schematic drawings of portions of three-dimensional structures, according to various embodiments. Part (a) is a schematic drawing of a portion of a three-dimensional structure having a plurality of layers, part (b) is a schematic drawing of a portion of a three-dimensional structure having the orientation of LCs of voxels in the first and second layer along a similar predefined alignment direction, part (c) is a schematic drawing of a portion of a three-dimensional structure showing two layers having distinct voxels comprising LCs substantially aligned in different respective orientations, part (d) is a schematic drawing of a portion of a three-dimensional structure with each layer having unidirectional alignment of LCs across the entire layer.

FIG. 5 depicts a series of schematic diagrams of a side view of a portion of products 500, 501, 520, 540, in accordance with various embodiments. As an option, the present products 500, 501, 520, 540 may be implemented in conjunction with features from any other inventive concept listed herein, such as those described with reference to the other FIGS. Of course, however, such products 500, 501, 520, 540 and others presented herein may be used in various applications and/or in permutations which may or may not be specifically described in the illustrative embodiments listed herein. Further, the product 500, 501, 520, 540 presented herein may be used in any desired environment.

According to one embodiment, a 3D structure has a plurality of layers comprised of LCEs A plurality of layers may be defined as a product having more than one layer, for example, two layers, three layers, four layers, etc. In various approaches, the number of layers is determined by a predefined three-dimensional model of the product. For example, as illustrated in part (a) of FIG. 5, a product 500 includes a portion of a 3D structure having plurality of layers, each layer having a plurality of voxels, and each voxel comprising LCEs substantially aligned in an orientation determined by a predefined alignment direction. Parts (b) through (d) illustrate examples of layers of a portion of a 3D structure and the orientation of aligned LCEs of each voxel according to a predefined alignment direction. The alignment orientation of the LCEs in parts (a) through (d) represent alignment of LCEs parallel to the plane of deposition of each layer. Each pattern illustrated in the figures represents a predefined alignment orientation but is not meant to define an orientation and thus each pattern is for illustration purposes only.

Part (b) of FIG. 5 illustrates a schematic drawing of a portion of product 501 having a plurality of sequentially-formed layers, showing two layers 504, 506 comprised of LCEs 508. In one approach, the 3D structure 502 has a layer 504 comprised of LCEs 508 present in at least a predefined portion 510, e.g., a voxel. The LCEs 508 in a portion 510 of the first 504 layer are substantially aligned in a predefined first orientation 512. In one approach, the orientations of a majority of, and preferably at least 90% of, the LCEs 508 in a predefined first portion 510 of a first layer 504 are substantially aligned in a predefined first orientation 512 relative to some reference, e.g., the plane of deposition of the layer. For example, as used in some approaches described herein, orientations being substantially aligned with a direction of the means, e.g., the LC molecule, mesogens, etc. that the mean longitudinal axes of the items so oriented are, on average, within 45° of the direction, preferably within 30° of the direction, more preferably within 15° of the direction, ideally within 10° of the direction.

A predefined orientation of the LC molecules of the LCE may be selected from a 360° alignment control in an x-y plane. For example, the orientation direction of the LC molecules may be any one of a radial direction in a 360° rotation of the theta direction, as illustrated in FIG. 2C. The predefined first orientation 512 may different than the orientation of the as-deposited alignment of the LCEs 508.

In one approach, LCE 508 are substantially aligned in a second orientation 513 in a predefined second portion 516 of the first layer 504 that may be different than the first orientation 512 of the LCEs 508 in the portion 510 of the same layer 504. In one approach, at least 90% of the LCEs 508 in the predefined second portion 516 of the first layer 504 are substantially aligned in the orientation 513 that is different than the first orientation 512.

In one approach, the 3D structure 502 includes a second layer 506 adjacent the layer 504. In one approach, the LCEs 508 are substantially aligned in a predefined second orientation in a predefined portion 514 of the second layer 506. In one approach, the second orientation may be is the same as the as the first orientation 512, where the first predefined orientation 512 is different than the orientation of the as-deposited alignment of the LCEs 508. The as-deposited alignment of the LCEs may be defined as the orientation of the LCEs following deposition of the resin during formation of a layer. In some approaches, the orientation of the as-deposited LCEs may include non-specific, isotropic, orientations of the LCEs at formation of the layer of the 3D structure in the absence of any aligning effects (e.g., magnetic field, photo alignment, etc.).

In one approach, the LCEs 508 in a portion 518 of the second layer 506 are substantially aligned in a predefined orientation 513 that may be different than the first orientation 512.

In one embodiment, as illustrated in a schematic drawing of a portion of a product 520 in part (c), a 3D structure 522 has a plurality of sequentially-formed layers 524, 526 comprised of LCEs 528 where the LCEs of each of the portions of each of the layers are substantially aligned in an orientation specific to each portion, respectively. For example, the LCEs 528 present in one portion 530 of the first layer 524 are substantially aligned in a first orientation 512. As described herein, the orientations of a majority of, and preferably at least 90% of, the LCEs 528 are substantially aligned (e.g., within 10° of each other, preferably) in a respective orientation direction relative to some reference, e.g., the plane of deposition of the layer. In one approach, a predefined orientation may be selected from a 180° alignment control, e.g., the orientation direction may be any one of a radial x-y planar direction in a 360° rotation, as illustrated in FIG. 2C. Each predefined orientation of the LCEs for each portion may be different than the as-deposited alignment direction of the LCEs 528.

The LCEs in a predefined second portion of the layer are substantially aligned along a different orientation than the LCEs of a different, adjacent, etc. portion of the same layer. For example, adjacent to the first portion 530, the LCEs 528 in a second portion 534 of the same layer 524 are substantially aligned in an orientation 515 that is different than the first orientation 512 of the LCEs 528 in the portion 530.

In a second layer 526, the LCEs 528 in another portion 532 are substantially aligned in an orientation 513 that may be different than the first orientation 512 and different from the second orientation 515. Further, each of the orientations 512, 513, 515 may be different than the non-specific orientation of the as-deposited alignment of the LCEs 528.

According to various embodiments, the lithography-based technique of using a DMD to define each voxel of a printed layer allows the printed 3D structure to have a contiguous region of aligned LCEs in one of the portion has a minimum dimension as determined by the lithography-based printing apparatus. In some approaches, the maximum dimensions (e.g., height, width, depth) of the contiguous region is substantially equal to the dimensions of a voxel of the printed structure. In an exemplary approach, a contiguous region of aligned LCEs has a minimum of about 75 μm per pixel pitch, where a pixel pitch is defined as a dimension of one pixel, one voxel, one portion, etc. For example, a contiguous region of aligned LCEs 528 of portion 536 of layer 524 has a minimum dimension, e.g., width $d_w$, thickness, $d_{th}$, etc. of about 75 μm.

According to one embodiment, as illustrated in a schematic drawing of a portion of product 540 in part (d), a 3D structure 542 has a plurality of sequentially-formed layers 544, 546 comprised of LCEs 548 where a portion may extend along the entire layer. For example, the LCEs 548 present in the first layer 544 are substantially aligned in a first orientation 512 and a portion 550 extends along the entire layer 544. The LCEs 548 present in the second layer 546 are substantially aligned in a second orientation 513 and a portion 552 extends along the entire layer 546. In one approach, the LCEs 548 in the second layer 546 are substantially aligned in an orientation that may be different than the orientation of the LCEs 548 in the first layer 544.

The illustrations of FIG. 5 are by way of example only and are not meant to be limiting in any way. Each embodiment may have a plurality of sequentially-formed layers and a plurality of portions determined by the 3D model of the structure being printed, and each orientation of the LCEs for each of the portions may be predefined according to the application of the structure.

According to various embodiments, the 3D structure is characterized as exhibiting a shape change in response to a stimulus. In various approaches, each of the portions of the 3D structure may be characterized as exhibiting a shape change in response to a stimulus. The shape change in the 3D structure may be realized with a formulation having a high actuation strain %, e.g., up to about 50% strain. The shape change may be reversible. In one approach, the shape change is represented by a greater than 5% volumetric change of the 3D structure. In one approach the shape change is represented by a greater than 5% change in at least one dimension of the 3D structure, e.g., the length in a longitudinal direction, the width perpendicular to the length of the 3D structure, the thickness of the 3D structure, etc.

Figure 6:
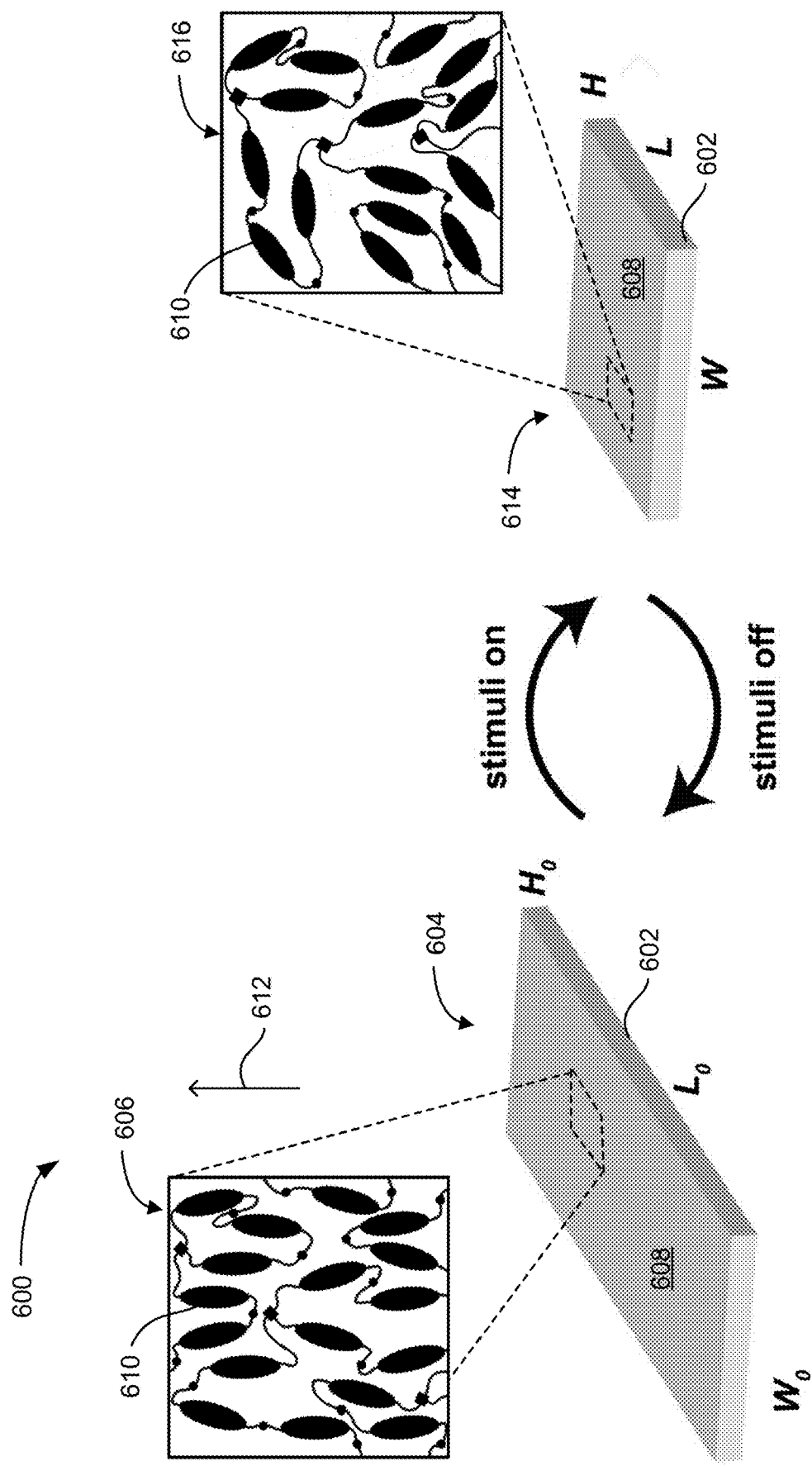
FIG. 6 is a schematic drawing of an actuation of a LCE structure, according to one embodiment.

FIG. 6 depicts a schematic drawing of an actuation 600 of an LCE structure 602, according to one approach. A structure 602 in an as-formed state 604 has a width Wo, length Lo, and height Ho. In the magnified view 606 of the LCE matrix 608, the LC molecules 610 in a nematic state such that the LC molecules 610 are substantially aligned according to a predefined orientation 612. Upon stimulation of the LCE structure 602, the LCE structure 602 undergoes a shape change such that the stimulated form 614 of the LCE structure 602 now has change in width W and height H, and in particular a significant change in the length L of the structure. The magnified view 616 of the LCE matrix 608 shows the LC molecules 610 have nonspecific orientations in an isotropic state. Removing the stimulant, turning off the stimuli, etc. causes the LCE structure 602 to return to the resting, as-formed state 604, e.g., a programmed aligned state, in which the LC molecules 610 are substantially aligned to a predefined orientation 612.

Experiments

FIG. 7 illustrates an example of a magnetic alignment of portions of a resin. The resin included a main-chain liquid crystal elastomer formulation comprising RM82 mesogen/nba, $T_{NI}$~95 C. Part (a) illustrates a schematic drawing of the apparatus 700 for magnetic alignment. A layer 702 of resin was loaded between two glass plates 704, and standalone neodymium magnet 706 was placed below a predefined portion 708 of the layer 702 of resin. A magnetic field was applied with the magnet 706 having a 0.5 Tesla magnetic field strength. It was noted that the 0.5 Tesla magnetic field strength is approximately half of the magnetic field used in studies for alignment of filler particles using a Fortify printer. The magnet 706 was placed underneath the glass slides and a UV light (large arrows) was exposed to the layers from the top slide to cure the layer 702 of resin between the glass plates 704. The magnetic field was removed, The layer 702 after curing includes a cured portion 708 of aligned LCEs 710 and cured regions 712 of un-aligned LCEs 714.

Part (b) of FIG. 7 is a polarized, optical microscope image of the magnetically aligned LCE. The dark regions of the image indicate random un-aligned LCEs 714 (illustrated as crosshatch region 712 of the layer 702 in part (a)) that were not exposed to a magnetic field during illumination of UV light. When viewed under a polarized optical microscope at 45°, with the analyzer (A) perpendicular to the polarizer (P), the bright regions of the image indicate aligned LCEs 710 (illustrated as diagonal line pattern of predefined portion 708 of the layer 702 in part (a)) cured during application of the magnetic field. The predefined alignment of LCEs demonstrated the use of magnetic field strength comparable to a Fortify printer to magnetically align a main-chain LCE resin for voxel-by-voxel alignment within 3D printed parts.

In Use

Various embodiments described herein may be developed for reversible and repeatable 3D-to-3D shape change, adaptive optics, soft robotics, tunable stiffness, architectures, cellular fluidics, fluid filter, stimuli responsive behavior, etc. Various embodiments described herein utilize liquid crystal elastomer alignment, 4D printing, responsive 3D structures, voxel-by-voxel shape change-directed printing, etc.

The inventive concepts disclosed herein have been presented by way of example to illustrate the myriad features thereof in a plurality of illustrative scenarios, aspects of an inventive concept, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of an inventive concept have been described above, it should be understood that they have been presented by way of example only, and not limitation. Thus, the breadth and scope of an aspect of an inventive concept of the present invention should not be limited by any of the above-described exemplary aspects of an inventive concept but should be defined only in accordance with the following claims and their equivalents.

What is claimed is:

1. A method of forming a three-dimensional structure comprising liquid crystal elastomers, the method comprising:
   forming a layer of resin comprising liquid crystal oligomers and a photoinitiator, the liquid crystal oligomers comprising at least one mesogen;
   applying a first magnetic field to the formed layer of resin in a predefined first alignment direction for substantially aligning the liquid crystal oligomers in a first orientation;
   exposing the formed layer to radiation for curing a first portion of the layer during application of the first magnetic field, thereby resulting in the first portion of the structure having liquid crystal elastomers substantially aligned in the first orientation;
   applying a second magnetic field to the formed layer of resin in a predefined second alignment direction for substantially aligning uncured liquid crystal oligomers in a second orientation; and
   exposing the layer to radiation for curing a second portion of the layer during application of the second magnetic field, thereby resulting in the second portion of the structure having liquid crystal elastomers substantially aligned in the second orientation,
   wherein forming the layer is performed while heating the resin to a temperature below the nematic-to-isotropic transition temperature of the at least one mesogen, an average aspect ratio of the at least one mesogen being about 3:1 to about 5:1, and the first and second magnetic fields being configured such that greater than 90% of uncured liquid crystal oligomers in the layer are substantially aligned in the first and second orientations, respectively, in less than 10 seconds.

2. The method as recited in claim 1, wherein the layer is formed using a lithography-based additive manufacturing system.

3. The method as recited in claim 1, wherein said heating is to a temperature range of greater than 50° C. to less than 100° C.

4. The method as recited in claim 1, wherein the predefined first alignment direction is different than the predefined second alignment direction.

5. The method as recited in claim 1, wherein each of the first and second portions comprises at least one voxel.

6. The method as recited in claim 1, further comprising, forming a second layer of the resin adjacent to the layer comprising the first and second portions of liquid crystal elastomers;
   applying a third magnetic field to the formed second layer of resin in a third predefined alignment direction for aligning liquid crystal oligomers of the second layer in a third orientation; and
   exposing the formed second layer to radiation for curing a first portion of the second layer during application of the third magnetic field thereby resulting in the first portion of the formed second layer having liquid crystal elastomers substantially aligned in the third orientation.

7. The method as recited in claim 1, wherein each of the liquid crystal oligomers include about 3 to 15 mesogens along the backbone thereof.

8. The method as recited in claim 1, wherein exposing the formed layer to the radiation comprises projecting illumination from a digital light projector.

9. The method as recited in claim 1, wherein each of the first and second portions is defined according to a respective mask applied to the formed layer during exposure of the layer to the radiation.

10. The method as recited in claim 1, wherein the resin includes an effective amount of an additive for assisting the alignment of the liquid crystal oligomers in a respective orientation under the applied first and second magnetic fields.

11. The method as recited in claim 1, wherein the substantial alignment is such that the liquid crystal oligomers are aligned within 10° of each other.

12. The method as recited in claim 1, wherein the resin includes a photoinhibitor.

13. The method as recited in claim 1, wherein each of the first and second portions of the structure is characterized as exhibiting a shape change in response to a stimulus, wherein the shape change is reversible.

14. The method as recited in claim 1, wherein a field strength of the first and second magnetic fields is from less than 0.06 tesla (T) to 0.01 T.

\* \* \* \* \*